United States Patent
Choi et al.

(10) Patent No.: US 9,523,801 B2
(45) Date of Patent: Dec. 20, 2016

(54) DUAL APERTURE CAMERA WITH IMPROVED COLOR GAMUT AND OPERATING METHOD OF THEREOF

(71) Applicant: CENTER FOR INTEGRATED SMART SENSORS FOUNDATION, Daejeon (KR)

(72) Inventors: Sang Gil Choi, Gyeonggi-do (KR); Jong Ho Park, Daejeon (KR); Chong Min Kyung, Daejeon (KR)

(73) Assignee: DUAL APERTURE INTERNATiONAL CO. LTD. (KR)

( * ) Notice: Subject to any disclaimer, the term of this patent is extended or adjusted under 35 U.S.C. 154(b) by 0 days.

(21) Appl. No.: 14/530,035

(22) Filed: Oct. 31, 2014

(65) Prior Publication Data

US 2016/0018574 A1    Jan. 21, 2016

(30) Foreign Application Priority Data

Jul. 15, 2014   (KR) ........................ 10-2014-0089209

(51) Int. Cl.
*G02B 5/20* (2006.01)
*H04N 9/04* (2006.01)
*H04N 5/33* (2006.01)

(52) U.S. Cl.
CPC ................ *G02B 5/20* (2013.01); *H04N 5/332* (2013.01); *H04N 9/045* (2013.01)

(58) Field of Classification Search
CPC ...... H04N 5/2353; H04N 5/225; H04N 5/332; H04N 5/2354; G01B 11/24; H01L 27/14875; G01S 17/08; G01S 17/89; G01S 7/4863; G01S 7/4816; G01N 21/553; G02B 21/0056; G02B 21/18; G02B 21/361
USPC ......................................... 348/342
See application file for complete search history.

(56) References Cited

U.S. PATENT DOCUMENTS

| | | | |
|---|---|---|---|
| 9,100,639 B2 * | 8/2015 | Hiramoto ........... G02B 27/0075 |
| 9,182,490 B2 * | 11/2015 | Velichko ............ H01L 27/14875 |
| 2007/0273784 A1 * | 11/2007 | Neil ........................ H04N 5/235 348/362 |
| 2007/0276256 A1 * | 11/2007 | Iddan ................... A61B 5/0091 600/473 |
| 2013/0026384 A1 * | 1/2013 | Kim ........................ G01S 17/89 250/393 |
| 2013/0113988 A1 * | 5/2013 | Wajs ...................... H04N 5/225 348/362 |
| 2013/0215231 A1 * | 8/2013 | Hiramoto ........... G02B 27/0075 348/46 |
| 2013/0222603 A1 * | 8/2013 | Agranov ................ H04N 5/332 348/164 |

(Continued)

FOREIGN PATENT DOCUMENTS

KR     1020060135772    12/2006
KR     100822053 B1    4/2008

*Primary Examiner* — Pritham Prabhakher
(74) *Attorney, Agent, or Firm* — Schmeiser, Olsen & Watts LLP

(57) ABSTRACT

Disclosed is a dual aperture camera which includes a dual band filter and a CMOS image sensor (CIS). The dual band filter is adapted to filter light signals to receive a light signal of a first wavelength range and receive a light signal of a second wavelength range through a pin hole included therein. The CIS is adapted to process the light signal of the first wavelength range and the light signal of the second wavelength range received through the dual band filter.

4 Claims, 5 Drawing Sheets

(56) References Cited

U.S. PATENT DOCUMENTS

2014/0138519 A1* 5/2014 Wang .................. G01S 17/89
250/206.1
2015/0144790 A1* 5/2015 Velichko .......... H01L 27/14875
250/338.4

* cited by examiner

DUAL APERTURE CAMERA WITH IMPROVED COLOR GAMUT AND OPERATING METHOD OF THEREOF

CROSS-REFERENCE TO RELATED APPLICATIONS

A claim for priority under 35 U.S.C. §119 is made to Korean Patent Application No. 10-2014-0089209 filed Jul. 15, 2014, in the Korean Intellectual Property Office, the entire contents of which are hereby incorporated by reference.

BACKGROUND

The inventive concepts described herein relate to a dual aperture camera with improved color gamut and an operating method thereof, and more particularly, relate to a dual aperture camera capable of improving color gamut by means of a dual band filter for selectively receiving two light signals having different wavelength ranges and an operating method thereof.

Referring to FIG. 1 which shows an operation of an infrared (IR) cut-off filter in a conventional dual aperture camera, an 810-nm cut-off filter is used as an IR cut-off filter 110 of the conventional dual aperture camera, and a CMOS image sensor (CIS) receives a light signal that has a wavelength range shorter than 810 nm.

A red (R) cell included in the CIS of the conventional dual aperture camera further receives an IR signal of a wavelength range 130 between 650 nm and 810 nm as much as 30% with respect to the whole light signal incident onto the R cell, other than a red signal of a wavelength range 120 between 580 nm and 650 nm. For this reason, both the IR signal and the R signal are processed when the R cell, included in the CIS of the conventional dual aperture camera, processes light signals to generate images, thereby causing the problem with color gamut. For example, a feeling of color of an image about a green plant or nylon-based clothes partially turns red.

Crosstalk of RGB cells may influence an image that is generated upon the RGB cells processing RGB signals. Thus, an error occurs at a depth extracting operation because the image having the problem with the color gamut is used. In particular, the R cell is influenced as much as about 18% even considering a decrease in the amount of light due to the pin hole. For this reason, an error may occur upon extracting of the depth about the R signal because an image formed of the R signal becomes clear, not sufficiently blur. For example, when the R cell is further influenced as much as about 18%, an 8-level depth error may occur at a depth level of 47.

Also, the conventional dual aperture camera further contains an infrared emitting diode (IRED) that generates a light signal of a 780-nm wavelength range allowing taking a picture indoors or at a dim environment. The light signal of the 780-nm wavelength range generated from the IRED of the conventional dual aperture camera is problematic in that the light signal is perceived by a person. In addition, most IREDs generate a light signal of a 850-nm or 940-nm wavelength range. In this regard, the light signal of the 780-nm wavelength range which the IRED of the conventional dual aperture camera generates is unmarketable.

Thus, it is provided a technique for making the color gamut of a dual aperture camera better by means of a dual band filter for selectively receiving two light signals of which the wavelength ranges are different from each other.

SUMMARY

One aspect of embodiments of the inventive concept is directed to provide a dual aperture camera which includes a dual band filter and a CMOS image sensor (CIS). The dual band filter is adapted to filter light signals to receive a light signal of a first wavelength range and receive a light signal of a second wavelength range through a pin hole included therein. The CIS is adapted to process the light signal of the first wavelength range and the light signal of the second wavelength range received through the dual band filter.

The light signal of the first wavelength range may be a light signal of a visible wavelength range and the light signal of the second wavelength range may be a light signal of an invisible wavelength range.

The light signal of the visible wavelength range may be a light signal having a wavelength range ranging from 400 nm to 650 nm, and the light signal of the invisible wavelength range may be a light signal having one of wavelength ranges ranging from 825 nm to 875 nm or wavelength ranges ranging from 915 nm to 965 nm.

The dual aperture camera may further include an infrared emitting diode (IRED) adapted to generate a light signal of an invisible wavelength range.

The CIS may include an infrared cell adapted to amplify an analogue gain about the light signal of the second wavelength range incident.

Another aspect of embodiments of the inventive concept is directed to provide an operating method of a dual aperture camera which includes filtering light signals through a dual band filter to receive a light signal of a first wavelength range; receiving a light signal of a second wavelength range through a pin hole included in the dual band filter; and processing the light signal of the first wavelength range and the light signal of the second wavelength range incident onto a CMOS image sensor (CIS).

The receiving a light signal of a first wavelength range may be receiving a light signal of a visible wavelength range using the dual band filter, and the receiving a light signal of a second wavelength range may be receiving a light signal of an invisible wavelength range through the pin hole.

The receiving a light signal of a visible wavelength range may be receiving a light signal of a wavelength range ranging from 400 nm to 650 nm, and, and the receiving a light signal of an invisible wavelength range may be receiving a light signal of a wavelength range having one of wavelength ranges ranging from 825 nm to 875 nm or wavelength ranges ranging from 915 nm to 965 nm.

The operating method may further include generating a light signal of an invisible wavelength range using an infrared emitting diode.

The processing the light signal of the first wavelength range and the light signal of the second wavelength range may include amplifying the light signal of the second wavelength range by means of an infrared cell included in the CIS.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
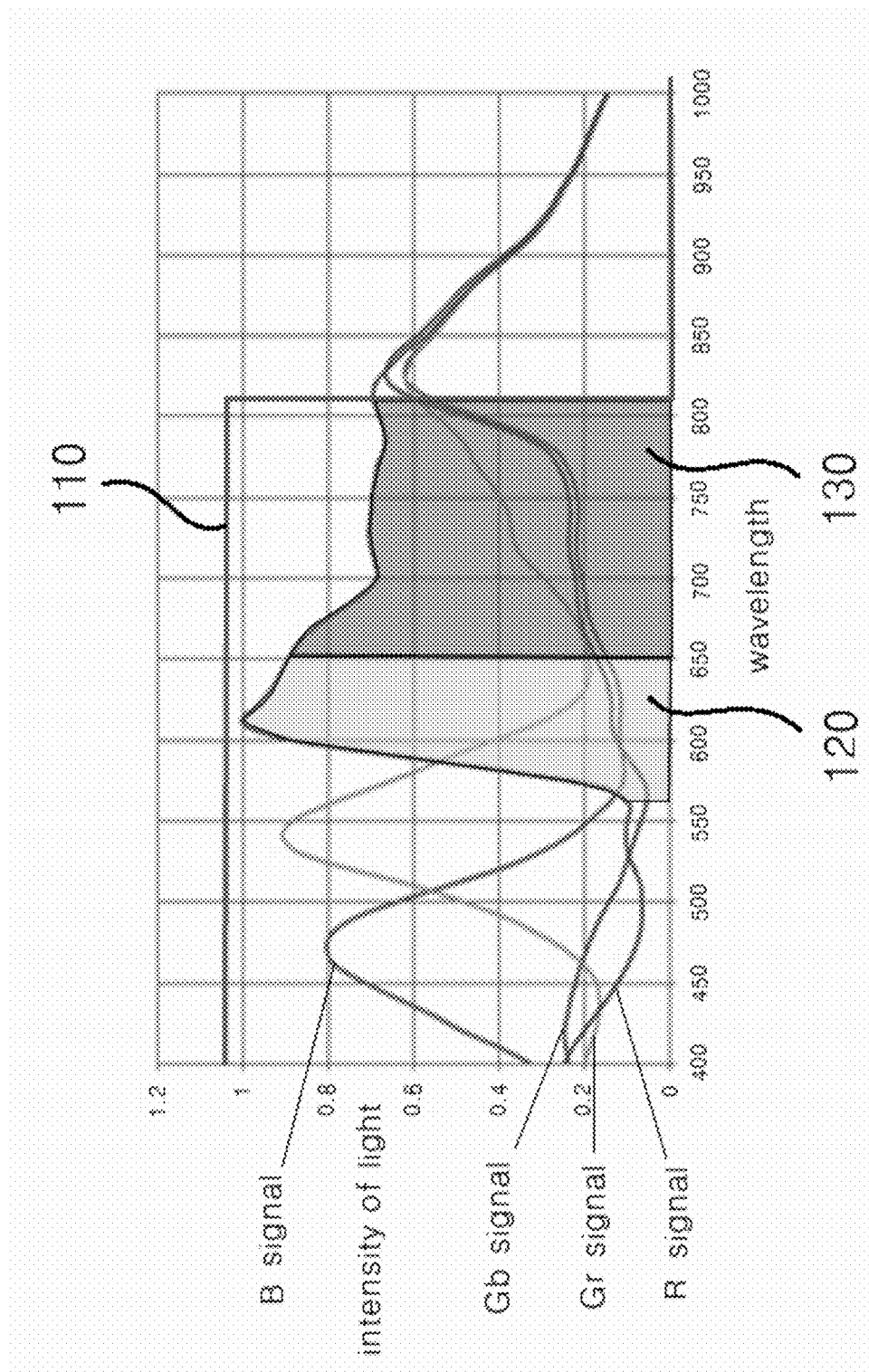
FIG. 1 is a diagram showing an operation of an infrared (IR) cutoff filter in a conventional dual aperture camera.

Embodiments will be described in detail with reference to the accompanying drawings. The inventive concept, however, may be embodied in various different forms, and should not be construed as being limited only to the illustrated embodiments. Rather, these embodiments are provided as examples so that this disclosure will be thorough and complete, and will fully convey the concept of the inventive concept to those skilled in the art. Accordingly, known processes, elements, and techniques are not described with respect to some of the embodiments of the inventive concept. Unless otherwise noted, like reference numerals denote like elements throughout the attached drawings and written description, and thus descriptions will not be repeated. In the drawings, the sizes and relative sizes of layers and regions may be exaggerated for clarity.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Also, the term "exemplary" is intended to refer to an example or illustration.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

Figure 2:
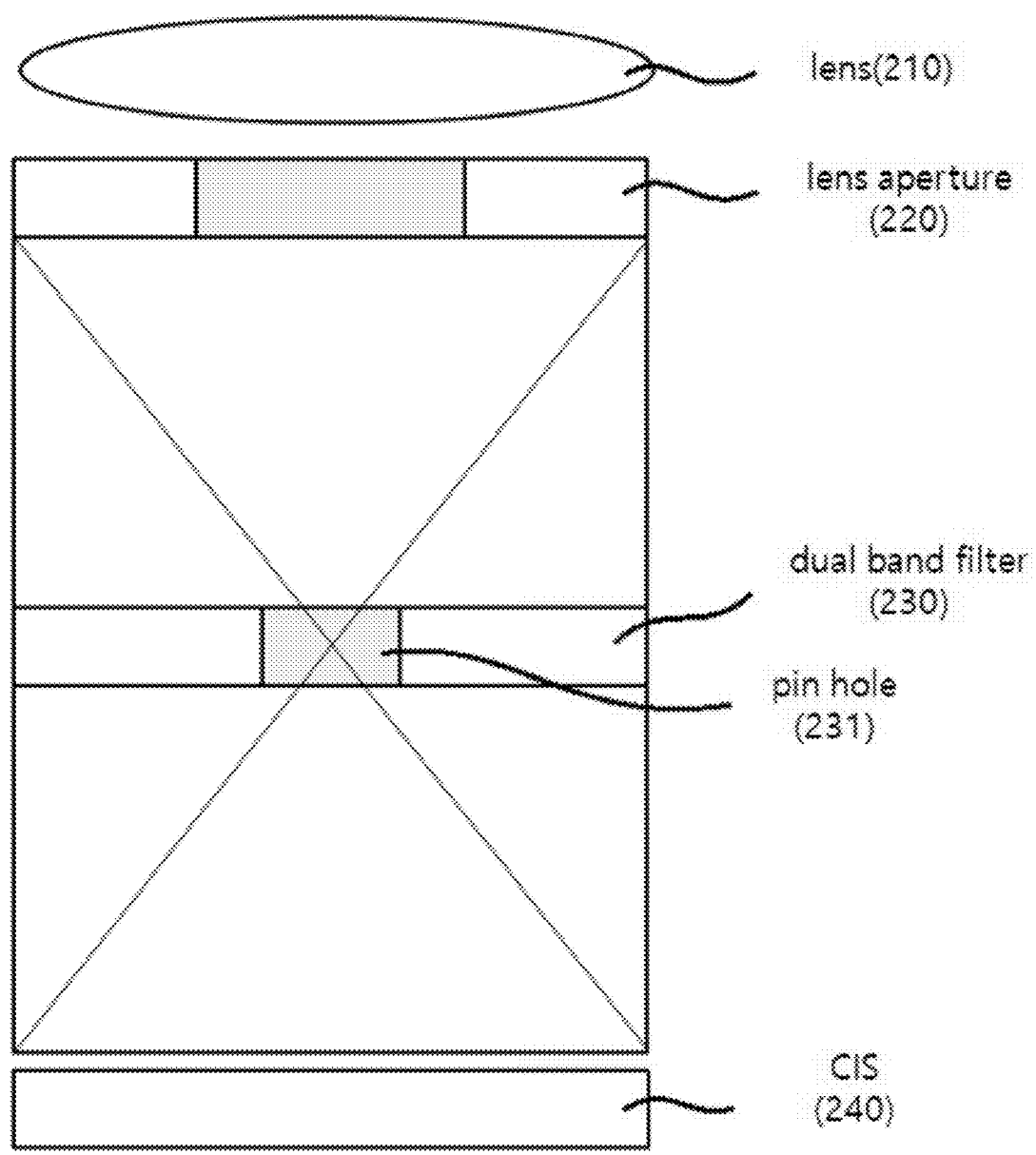
FIG. 2 is a diagram showing a dual aperture camera according to an embodiment of the inventive concept.

FIG. 2 is a diagram showing a dual aperture camera according to an embodiment of the inventive concept.

Referring to FIG. 2, a dual aperture camera according to an embodiment of the inventive concept contains a lens 210, a lens aperture 220, a dual band filter 230, and a CMOS image sensor (CIS) 240. Below, a dual aperture camera that does not include an image signal processor (ISP) will be described because the CIS 240 performs the function of the ISP. However, the scope and spirit of the inventive concept may not be limited thereto. For example, the scope and spirit of the inventive concept may be also applied to a dual aperture camera that includes the ISP.

The dual band filter 230 selectively receives two light signals, having different wavelength ranges, from among light signals (e.g., light signals including RGB signals and an IR signal) input through the lens 210 and the lens aperture 220. In detail, the dual band filter 230 filters a light signal to receive a light signal having a predetermined first wavelength range and receive a light signal having a predetermined second wavelength range through a pin hole 231 included therein. In exemplary embodiments, the first wavelength range may be a visible wavelength range, and the second wavelength range may be an invisible wavelength range.

For example, the dual band filter 230 filters light signals each having a wavelength longer than about 650 nm such that a light signal having a wavelength range between 400 nm and 650 nm is incident onto the CIS 240 and such that a light signal having one of wavelength ranges ranging from 915 nm to 965 nm is incident onto the CIS 240 through the pin hole 231 included therein. This will be more fully described with reference to FIG. 3.

The CIS 240 processes two light signals of different wavelength ranges received through the dual band filter 230, respectively. In detail, the CIS 240 generates an image by processing a light signal of the first wavelength range and a light signal of the second wavelength range. In exemplary embodiments, the first wavelength range may be a visible wavelength range, and the second wavelength range may be an invisible wavelength range.

In exemplary embodiments, the CIS 240 may include red, green, and blue (RGB) cells (not shown) for processing light signals each having a wavelength range between 400 nm and 650 nm, thereby making it possible to process RGB signals, respectively. The CIS 240 may further include an IR cell (not shown) for processing a light signal having one of wavelength ranges ranging from 915 nm to 965 nm, thereby making it possible to process an IR signal.

The amount of light signal of an invisible wavelength range incident onto the R cell of the CIS 240 is reduced up to about 10% as compared with that of a conventional dual aperture camera. The reason is that the dual band filter 230 passes a light signal having one of wavelength ranges ranging from 825 nm to 875 nm or wavelength ranges ranging from 915 nm to 965 nm. The color gamut of an image generated by the dual aperture camera according to an embodiment of the inventive concept can become better than that of an image generated by a conventional dual aperture camera. In addition, the dual aperture camera according to an embodiment of the inventive concept uses the dual band filter 230 that reduces the amount of light signal having an invisible wavelength range incident onto the RGB cells in comparison with the conventional dual aperture camera, thereby making it possible to prevent an error due to IR signals incident onto the RGB cells upon extracting of the depth.

The IR cell included in the CIS 240 may amplify analogue gain about a light signal of the second wavelength range. For example, the IR cell may amplify analogue gain of a light signal, having an invisible wavelength range that is one of wavelength ranges ranging from 825 nm to 875 nm or wavelength ranges ranging from 915 nm to 965 nm, from among light signals incident thereon. Thus, the IR cell included in the CIS 240 can sense a small amount of light signal received through the pin hole 231 of the dual band filter 230.

Although not shown in figure, the dual aperture camera may further include an infrared emitting diode (IRED) that generates a light signal of an invisible wavelength range such that a picture is captured indoors or at a dim environment. For example, the IRED may generate a light signal of which the wavelength range is 850 nm or 940 nm. Therefore, the dual aperture camera according to an embodiment of the inventive concept is marketable and generates a light signal of a wavelength range that is not perceived by a person.

Figure 3:
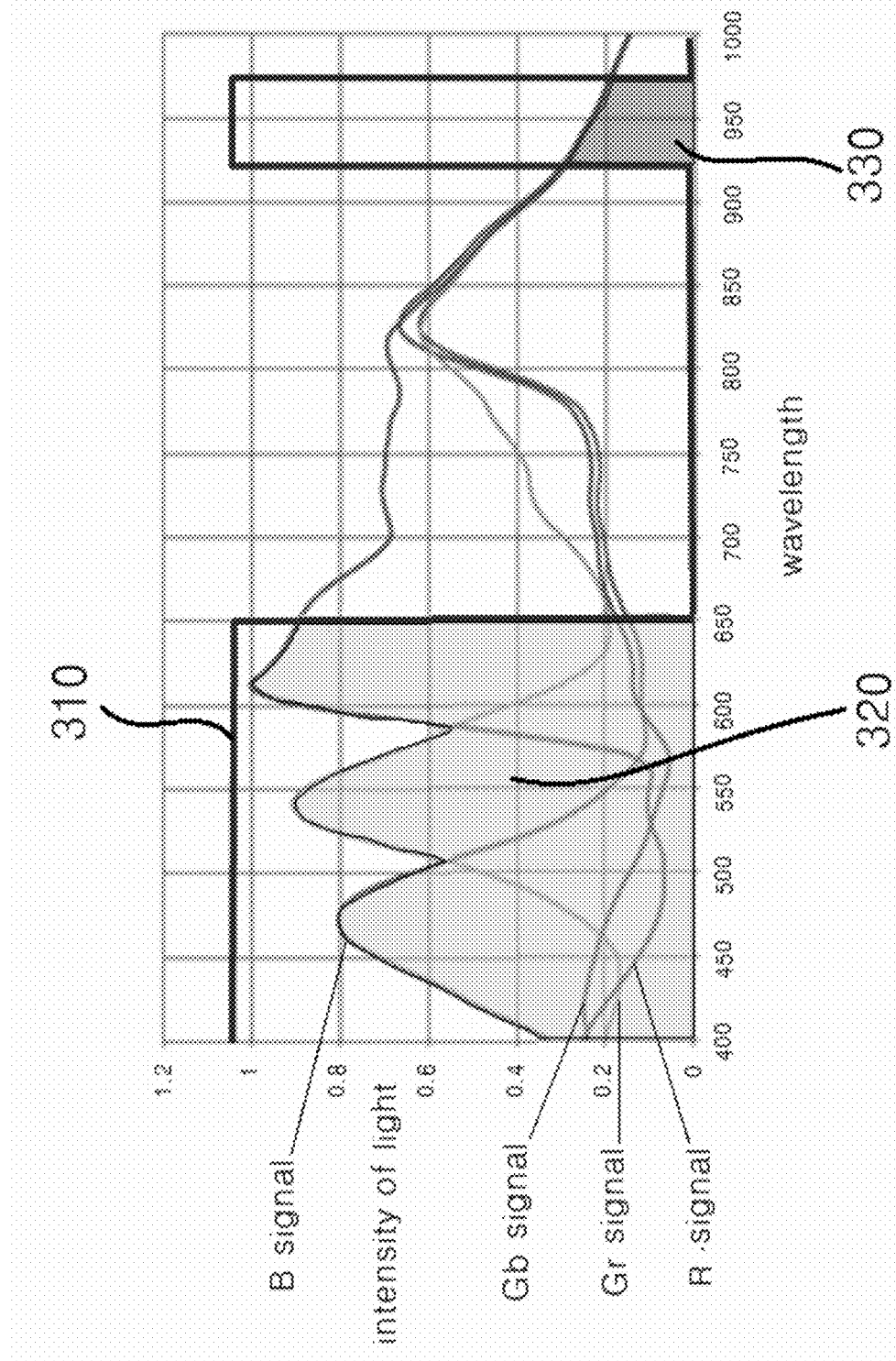
FIG. 3 is a diagram showing an operation of a dual band filter in a dual aperture camera according to an embodiment of the inventive concept.

FIG. 3 is a diagram showing an operation of a dual band filter in a dual aperture camera according to an embodiment of the inventive concept.

Referring to FIG. 3, a dual band filter 310 according to an embodiment of the inventive concept filters light signals such that a light signal of a first wavelength range 320 is incident onto a CIS and such that a light signal of a second wavelength range 330 is incident onto the CIS through a pin hole included therein. In exemplary embodiments, the first wavelength range 320 may be a visible wavelength range, and the second wavelength range 330 may be an invisible wavelength range.

For example, the dual band filter 230 filters light signals each having the first wavelength longer than about 650 nm such that a light signal having the first wavelength range between 400 nm and 650 nm is incident onto the CIS. In exemplary embodiments, a light signal having a wavelength range between 400 nm and 650 nm may include B, Gb, Gr, and R signals.

Also, because the dual band filter 310 includes an infrared emitting diode (IRED) that generates a light signal having a 850-nm or 940-nm wavelength range such that a picture is captured indoors or at a dim environment, a light signal having the second wavelength range 330, which is one of wavelength ranges ranging from 915 nm to 965 nm or wavelength ranges ranging from 825 nm to 875 nm, is incident onto the CIS through the pin hole. An embodiment of the inventive concept is exemplified in FIG. 3 as the second wavelength range 330 is a wavelength range ranging from 915 nm to 965 nm. However, the scope and spirit of the inventive concept may not be limited thereto. the second wavelength range 330 may range from 825 nm to 875 nm.

As the dual band filter 310 operates as described above, the amount of light signal having the second wavelength range 330 which is an invisible wavelength range incident onto an R cell of the CIS is reduced up to about 10% as compared with that of a conventional dual aperture camera. Thus, the color gamut of an image generated by a dual aperture camera according to an embodiment of the inventive concept can become better than that of an image generated by a conventional dual aperture camera. In addition, the dual aperture camera according to an embodiment of the inventive concept uses the dual band filter 230, thereby making it possible to prevent an error due to IR signals incident onto the RGB cells upon extracting of the depth.

Figure 4:
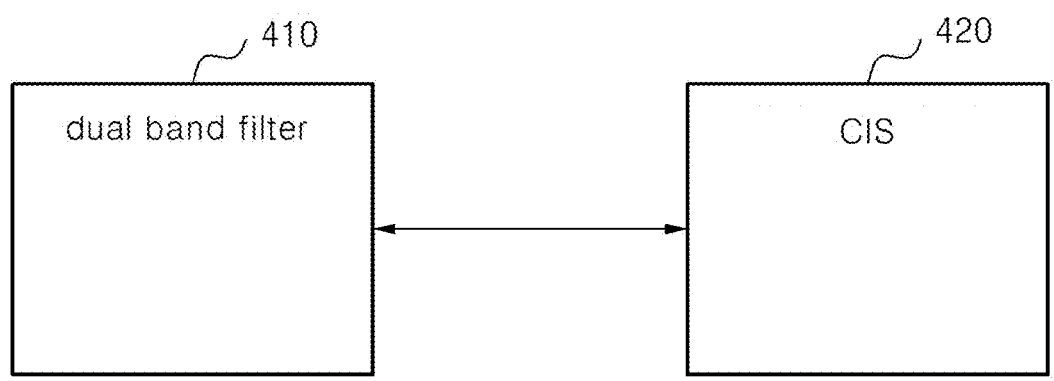
FIG. 4 is a block diagram schematically illustrating a dual aperture camera according to an embodiment of the inventive concept.

FIG. 4 is a block diagram schematically illustrating a dual aperture camera according to an embodiment of the inventive concept.

Referring to FIG. 4, a dual aperture camera according to an embodiment of the inventive concept contains a dual band filter 410 and a CMOS image sensor (CIS) 420.

The dual band filter 410 filters a light signal to receive a light signal having a predetermined first wavelength range and receive a light signal having a predetermined second wavelength range through a pin hole included therein.

The CIS 420 processes a light signal of the first wavelength range and a light signal of the second wavelength range received through the dual ban filter 410.

The CIS 420 may include an IR cell for amplifying analogue gain about a light signal of the second wavelength range received.

In exemplary embodiments, a light signal of the first wavelength range may be a light signal of a visible wavelength range, and a light signal of the second wavelength range may be a light signal of an invisible wavelength range.

In exemplary embodiments, a light signal of the visible wavelength range may be a light signal having a wavelength range ranging from 400 nm to 650 nm, and a light signal of the wavelength range may be a light signal having one of wavelength ranges ranging from 825 nm to 875 nm or wavelength ranges ranging from 915 nm to 965 nm.

In exemplary embodiments, although not shown in figure, the dual band filter 410 may further include an infrared emitting diode (IRED) that generates a light signal of an invisible wavelength range. For example, the IRED may generate a light signal of which the wavelength range is 850 nm or 940 nm.

Figure 5:
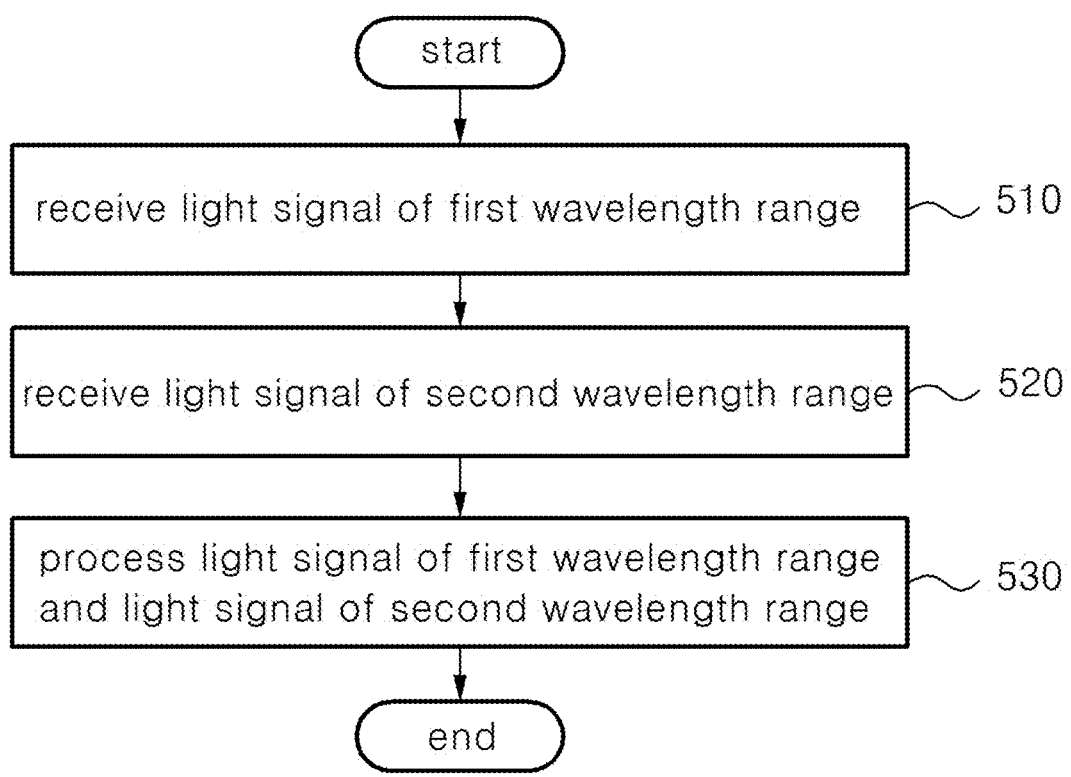
FIG. 5 is a flow chart showing an operating method of a dual aperture camera according to an embodiment of the inventive concept.

FIG. 5 is a flow chart showing an operating method of a dual aperture camera according to an embodiment of the inventive concept.

Referring to FIG. 5, in block 510, a dual aperture camera according to an embodiment of the inventive concept filters a light signal through a dual band filter to receive a light signal of a predetermined first wavelength range. At this time, the step of receiving the light signal of the first wavelength range may be the step of receiving a light signal of a visible wavelength range by means of the dual band filter. Also, the step of receiving the light signal of the visible wavelength range may be the step of receiving a light signal of a wavelength range ranging from 400 nm to 650 nm through the dual band filter.

In block 520, the dual aperture camera receives a light signal of a predetermined second wavelength range through a pin hole included therein. At this time, the step of receiving the light signal of the second wavelength range may be the step of receiving a light signal of an invisible wavelength range through the pin hole. Also, the step of receiving the light signal of the invisible wavelength range may be the step of receiving a light signal having one of wavelength ranges ranging from 825 nm to 875 nm or wavelength ranges ranging from 915 nm to 965 nm.

In block 530, the dual aperture camera processes the light signal of the first wavelength range and the light signal of the second wavelength range incident onto the CIS.

When processing the light signal of the first wavelength range and the light signal of the second wavelength range, the dual aperture camera may amplify analogue gain about a light signal of the second wavelength range incident onto an IR cell included in the CIS.

In addition, although not shown in figure, the dual aperture camera may generate a light signal of an invisible wavelength range by means of an IRED. In exemplary embodiments, the IRED may generate a light signal of which the wavelength range is 850 nm or 940 nm.

According to embodiments of the inventive concept, the color gamut can be improved through a dual band filter for selectively receiving two light signals having different wavelength ranges (i.e., a visible wavelength range and an invisible wavelength range). Also, as the dual band filter is used, it is possible to prevent an error generated upon extracting of the depth.

While the inventive concept has been described with reference to exemplary embodiments, it will be apparent to those skilled in the art that various changes and modifications may be made without departing from the spirit and scope of the inventive concept. Therefore, it should be understood that the above embodiments are not limiting, but illustrative.

What is claimed is:

1. A dual aperture camera, comprising:
   a lens;
   a lens aperture, wherein light in a first wavelength range and light in a second wavelength range passes through the lens and the lens aperture;
   a dual band filter that filters out a first portion of the light in the second wavelength range, wherein the dual band filter comprises a pin hole through which a second portion of the light in the second wavelength range passes through the dual band filter;
   a CMOS image sensor (CIS) that processes the light in the first wavelength range and the second portion of the light in the second wavelength range that passes through the pin hole in the dual band filter; and
   an image signal processor that extracts three-dimensional depth information of an object based on the light in the first wavelength range processed by the CIS and the second portion of the light in the second wavelength range that passes through the pin hole in the dual band filter and processed by the CIS,
   wherein the light in the first wavelength range is in a visible light wavelength range and the light in the second wavelength range is in an invisible light wavelength range,
   wherein the visible light wavelength range is between approximately 400 nm and 650 nm, and
   wherein the invisible light wavelength range is between approximately 915 nm and 965 nm;
   wherein the dual band filter reduces the amount of the light in the second wavelength range incident onto RGB cells of the CIS to prevent an error due to IR (infrared) signals incident onto the RGB cells upon extracting of a depth; and
   an infrared cell amplifies an analog gain of the second portion of the light in the second wavelength range received by the CIS.

2. The dual aperture camera of claim 1, further comprising:
   an infrared emitting diode (IRED) that generates light in the invisible light wavelength range.

3. An operating method of a dual aperture camera, comprising:
   passing light in a first wavelength range and light in a second wavelength range through a lens and a lens aperture;
   filtering out a first portion of the light in the second wavelength range and passing light in the first wavelength range through a dual band filter;
   passing a second portion of the light in the second wavelength range through a pin hole in the dual band filter;
   processing at a CMOS image sensor (CIS) the light in the first wavelength range and the second portion of the light in the second wavelength range that are incident onto the CIS; and
   extracting at an image signal processor three-dimensional depth information of an object based on the light in the first wavelength range processed by the CIS and the second portion of the light in the second wavelength range that passes through the pin hole in the dual band filter and is processed by the CIS,
   wherein the light in the first wavelength range is in a visible light wavelength range and the light in the second wavelength range is in an invisible light wavelength range,
   wherein the visible light wavelength range is between approximately 400 nm and 650 nm, and
   wherein the invisible light wavelength range is between approximately 915 nm and 965 nm;
   wherein the dual band filter reduces the amount of the light in the second wavelength range incident onto RGB cells of the CIS to prevent an error due to IR (infrared) signals incident onto the RGB cells upon extracting of a depth; and
   wherein the processing at the CIS of the light in the first wavelength range and the second portion of the light in the second wavelength range includes:
   amplifying the second portion of the light in the second wavelength range by an infrared cell included in the CIS.

4. The operating method of claim 3, further comprising:
   generating light in the invisible light wavelength range using an infrared emitting diode.

* * * * *